Oct. 11, 1966  A. W. NICONCHUK  3,277,642
TIRE REPAIR UNITS
Filed March 16, 1964
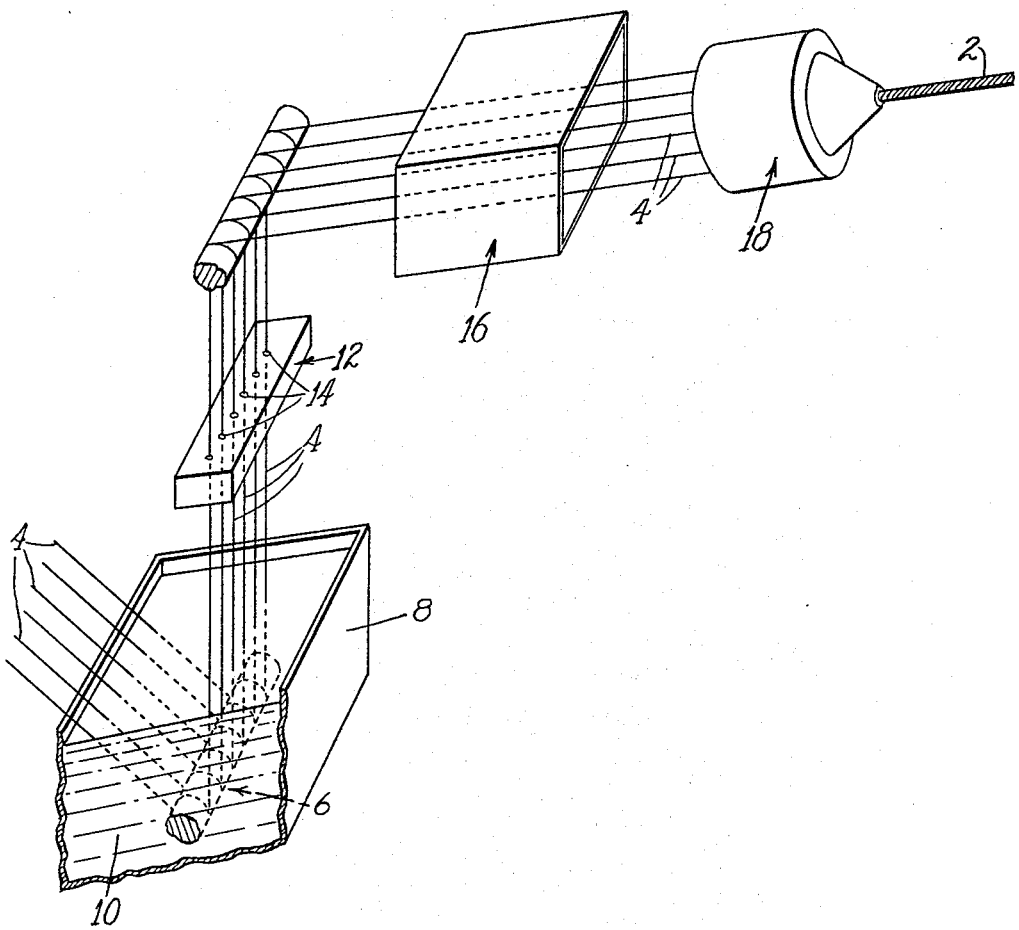
*Inventor*
Alec W. Niconchuk
By his Attorney
Vincent A. White

3,277,642
TIRE REPAIR UNITS
Alec W. Niconchuk, 267 Lowell St., Peabody, Mass.
Filed Mar. 16, 1964, Ser. No. 351,958
4 Claims. (Cl. 57—164)

This invention relates to a tire repair material for sealing holes in tubeless tires or the like. More particularly the invention is directed to a greatly improved repair cord and a method of making such a cord.

The method of repairing holes in tubeless tires particularly by the insertion of cords coated with a flowable sealing material has come into fairly common usage. Such cords are commonly made from fibrous materials such as jute, hemp, cotton, silk, flax, synthetic materials or the like. Presently available repair cords are coated with sealing material by immersing them in a bath of the sealing material. The material strikes through at least the outer surface of the cord and at best only partially impregnates the cord fibers. This type of cord, however, has proven generally satisfactory to seal punctured tires when inserted in the punctures, the flowable sealing material acting to prevent passage of air between the cord and the sides of the hole. It has been found however that at times the impregnation of the cord with sealing material has not been adequate resulting in leakage of air through the cord and a failure of the repair. To overcome this, thinner cords have been used to insure proper impregnation of the sealing material but this results in the necessity of using a number of cords side by side to fill a puncture.

Accordingly, it is an object of the present invention to provide a greatly improved tire repair cord by a novel method. To this end the cord is formed of a plurality of individual threads of fibrous material, the threads each being individually coated with sealing material and thereafter twisted together to form the cord itself. In this way the entire cord is thoroughly impregnated with the sealing material to effectively prevent escape of air through or around the cord when inserted in a tire puncture.

The invention will now be described together with novel details of construction with particular reference to the accompanying drawing and will thereafter be particularly pointed out in the claims.

Referring to the drawing there may be seen in diagrammatic form an apparatus particularly suited for making the repair cord of the present invention.

The cord 2 is formed of a plurality of fine threads 4 each individually coated and thoroughly saturated with a sealing material. The sealing material may comprise a flowable plastic rubber which is somewhat similar to the composition of the rubber found in the tires to be repaired. However, a rather wide variety of sealing materials have been found to be effective and other materials may be used without departing from the scope of the invention. The threads used to make up the cord are preferably fine to ensure complete impregnation but may be relatively coarse depending on the softness of the cord desired and the type of fibers used in the threads. Unsized cotton threads have been found to be particularly suitable and easily absorbs the sealing material. The sealing material before application preferably is combined with a solvent to form a solution in which the threads may be easily immersed and which permits the material in solution to penetrate the fibers in the threads.

Referring to the drawing it may be seen that the threads 4 are fed from a plurality of spools (not shown) along separated paths around a series of individual pulleys 6 mounted in a tank 8 which contains the sealing material 10 in solution. It should be understood that alternatively the sealing material in the tank could be composed of all solids which may be liquified by heat as in a hot melt material without departing from the scope of the invention. In this event the tank 8 would be fitted with suitable heaters. It should further be understood that where required the threads could be conducted through the solution in a tortuous path by a series of pulleys or other conductors in the tank.

From the tank the threads 4 which preferably are now coated with an excess of sealing material pass through a stripper mechanism 12 which may include a plurality of spaced orifices 14 of predetermined size adapted to permit passage of the individual threads and a coating of the desired thickness thus ensuring a uniform coating of sealing material on each thread. With certain thread and sealing materials it will not be necessary to pass the threads through a stripper mechanism to ensure a uniform coating. Thereafter, the threads still separated from each other are fed through a drying chamber 16 where the threads are subjected to heat and/or air to remove the solvent from the sealing material. In this manner each thread is uniformly coated and thoroughly saturated with the sealing material. Finally the individual threads are fed through a twisting head 18 which twists the threads together into the cord 2 which then may be wound over a spool or cut into lengths to form individual tire repair units.

It should be clear that the above apparatus has been described only by way of example to set forth the general method of producing the desired cord. Obviously, the apparatus may be varied considerably to suit particular thread materials as well as to suit the type of sealing material utilized. For example, where the sealing material comprised a hot melt material there would be no need for a separate drying unit since no solvent would be involved and since the material would return to the desired consistency as soon as the temperature of the material fell below the melting point without the application of heat or air.

By varying the number and coarseness of the threads used, the thickness and softness of the cord may be easily varied without changing its effectiveness. Furthermore, it is immaterial to the scope of the invention what material is used in the threads or whether they are coarse or fine as long as each thread is individually saturated and coated with sealing material before being combined into a cord. To form a soft pliable cord it has been found that a twist in the cord of from no turns to two turns per inch produces excellent results. Where a firmer cord is required two or more twists of cord is suitable.

Having thus described my invention, what I claim as novel and desire to secure by Letters Patent of the United States is:

1. A method of forming tire repair units comprising the steps of applying to a plurality of individual threads of fibrous material a coating of sealing material and thereafter combining the coated threads to form a cord for sealing holes in tires or the like.

2. A method of forming tire repair units comprising the steps of passing a plurality of individual separated threads of fibrous material through a solution including a flowable sealing material and a solvent for coating each thread with said sealing material, thereafter applying heat or air to remove the solvent from said coating, and finally combining said threads to form a cord for sealing holes in tires or the like.

3. A method of forming tire repair units comprising the steps of passing a plurality of individual separated threads of fibrous material through a solution including a flowable sealing material and a solvent for coating each thread with an excess of said sealing material, stripping the excess sealing material from each thread to form a uniform coating on each thread, applying heat or air to the coated threads to remove solvent from said coating, and finally twisting said individually coated threads together to form a cord for sealing holes in tires or the like.

4. The tire repair unit made in accordance with the method of claim 1.

References Cited by the Examiner
UNITED STATES PATENTS

| | | | |
|---|---|---|---|
| 682,401 | 9/1901 | Bolton | 156—97 X |
| 1,766,333 | 6/1930 | Forehand | 156—97 X |
| 2,803,284 | 8/1957 | Mullen | 152—367 |
| 3,035,626 | 5/1962 | Mullen | 152—370 |
| 3,049,164 | 8/1962 | Humphreys et al. | 152—370 |
| 3,169,567 | 2/1965 | Covert et al. | 152—370 |

FOREIGN PATENTS

| | | |
|---|---|---|
| 822,727 | 9/1937 | France. |
| 1,179,171 | 12/1958 | France. |

FRANK J. COHEN, *Primary Examiner.*

J. PETRAKES, *Assistant Examiner.*